United States Patent [19]

Kennedy et al.

[11] Patent Number: 4,524,188

[45] Date of Patent: Jun. 18, 1985

[54] SYNTHESIS AND COPOLYMERIZATION OF ASYMMETRIC POLYMERS

[75] Inventors: Joseph P. Kennedy; Misao Hiza, both of Akron, Ohio

[73] Assignee: University of Akron, Akron, Ohio

[21] Appl. No.: 490,554

[22] Filed: May 2, 1983

[51] Int. Cl.$^3$ .......................................... C08F 110/10
[52] U.S. Cl. ................................ 525/333.7; 525/353; 525/359.1; 525/359.4; 525/359.5; 525/359.6; 525/377; 525/379; 525/384; 525/309; 525/319; 526/348.7
[58] Field of Search ............ 525/335, 353, 359, 333.7, 525/359.3; 526/348.7

[56] References Cited

U.S. PATENT DOCUMENTS

| | | | |
|---|---|---|---|
| 3,786,116 | 1/1974 | Milkovich et al. | 525/276 |
| 4,276,394 | 6/1981 | Kennedy et al. | 525/245 |
| 4,316,973 | 2/1982 | Kennedy | 525/335 |
| 4,327,201 | 4/1982 | Kennedy et al. | 526/131 |
| 4,442,261 | 4/1984 | Kennedy et al. | 525/324 |

*Primary Examiner*—Carman J. Seccuro
*Attorney, Agent, or Firm*—Oldham, Oldham & Weber Co.

[57] ABSTRACT

The invention encompasses the synthesis of telechelic, i.e., terminally functional, macromolecular monomers (macromers) and their subsequent homo- and copolymerization. The macromers produced are asymmetric, having dissimilar head and tail groups which provide independent reaction sites. Macromers include α-phenyl-ω-t-chloropolyisobutylene, which can be reacted to form poly(methyl methacrylate-g-isobutylene). The graft copolymers provide novel physical properties which are the product of the respective grafts.

10 Claims, No Drawings

SYNTHESIS AND COPOLYMERIZATION OF ASYMMETRIC POLYMERS

TECHNICAL FIELD

This invention falls within the field of polymer synthesis, and in particular the synthesis of novel asymmetric prepolymers which can be graft copolymerized.

BACKGROUND ART

It has long been recognized that graft copolymers can readily be prepared through the copolymerization of macromolecular monomers (macromers) with conventional small monomers. The instant invention concerns the synthesis of heretofore unknown graft copolymers through the preparation and copolymerization of macromers having terminal (i.e., telechelic) functionalities which are non-identical to each other, thereby forming what shall hereinafter be termed asymmetric polymers. When one such terminal functionality is more reactive than the other, selective chain propagation and/or end group reaction can produce novel polymers. The macromers thus in effect are used as prepolymers for subsequent linear or graft copolymerizations.

To the inventors' knowledge, there are no prior art references describing this type of macromer or the resulting products of its copolymerization. Descriptive of the art of graft copolymerization in general are various published articles and patents. U.S. Pat. No. 3,786,116 describes in broad terms the operation of graft copolymers.

The synthesis of polyisobutylene-based macromers carrying one polymerizable head group such as vinylbenzyl have been described in U.S. Pat. No. 4,327,201 and Polym. Prepr. 23(2),99 (1982), Kennedy and Lo.

These macromer syntheses involve controlled initiation, transferless propagation and controlled termination. The end products however are considerably different from those of the instant invention due to the different mechanism involved, i.e., absence of transfer agent.

DISCLOSURE OF THE INVENTION

It is accordingly an aspect of the invention to provide a macromolecular monomer or macromer having asymmetric terminal functionalities.

Another aspect of the invention is to provide a macromer, as above, which is obtained by the use of monofunctional initiator-chain transfer agents.

It is yet another aspect of the invention to provide a macromer, as above, which can be graft copolymerized.

It is yet another aspect of the invention to provide a macromer, as above, which contains polyisobutylene as a backbone.

It is still another aspect of the invention to provide a macromer, as above, which contains exactly one terminal methacrylate function.

It is yet another aspect of the invention to provide a macromer, as above, which can be copolymerized with methyl methacrylate.

It is still another aspect of the invention to provide a macromer, as above, which is produced through reaction of α-phenyl-ω-t-chloropolyisobutylene.

These aspects and others which are presented in more detail hereinafter are acheived by: an asymmetrically telechelic polymer, comprising:

A—PIB—B wherein PIB is a polyisobutylene backbone, and A and B are different and are selected from the group consisting of phenyl; substituted phenyl wherein the substitution may be at any position and is selected from the group consisting of vinyl, —SO$_3^\ominus$, —OH, —NO$_2$ and alkyl groups having from 1 to 10 carbon atoms; t-chloro; methacrylate; hydroxyl; and vinyl.

BEST MODE FOR CARRYING OUT THE INVENTION

The synthesis of asymmetrically telechelic polymers requires the use of monofunctional initiator-chain transfer agents, or "minifers" for short. Exemplary of such a reaction is the preparation of α-phenyl-ω-t-chloropolyisobutylene (Ph-PIB-Cl$^t$) using cumyl chloride/BCl$_3$ and isobutylene. The postulated mechanism for this reaction is as follows:

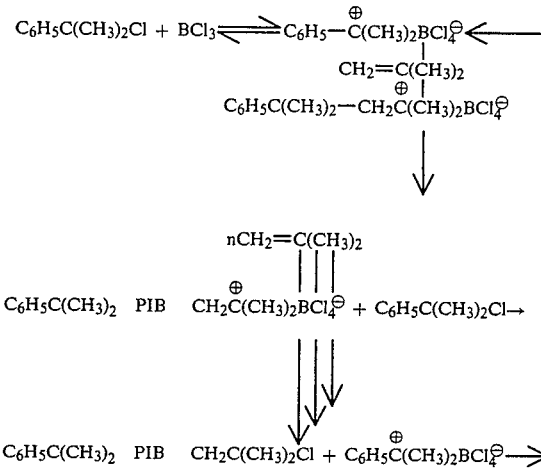

Both of the terminal functions, the phenyl and the tertiary chloro groups, can be used thereafter for a variety of transformations. Additional asymmetric polymers which can be produced by the minifer technique include: α-phenyl-ω-isopropenyl-polyisobutylene and polyisobutenyl alcohol (PIB-CH$_2$OH).

Example 1 illustrates a preferred technique for preparation of Ph-PIB-Cl$^t$.

In addition to cumyl chloride, a number of other minifers have been examined as to their effect on the polymerization of isobutylene. The results are summarized in Table I. Cumyl chloride, p-methyl-cumyl chloride and p-chlorocumyl chloride yielded number average terminal functionalities, $\overline{F}_n$'s, close to theoretical ($\overline{F}_n = 1.0$) signifying that each macromolecule contained one phenyl and one t-chloro terminus. The relatively high $\overline{M}_n$'s and very low $I_{eff}$'s obtained with benzyl chloride and α-methylbenzyl chloride indicate rather low inifer activity. Cumyl chloride is a better chain transfer agent (lower $\overline{M}_n$), however, its $I_{eff}$ is still 0.62. p-Methylcumyl chloride is an excellent minifer as it yields the lowest $\overline{M}_n$ and its $I_{eff}$ is maximum (unity). p-Chlorocumyl chloride is a much less reactive chain transfer agent as indicated by the relatively high $\overline{M}_n$ and low $I_{eff}$. The effect of temperature on polymerization can be seen with reference to Table II. The cumyl chloride/BCl$_3$/isobutylene/CH$_3$Cl system was used. $\overline{F}_n$'s were close to theoretical in the −60 degree to −17.5 degree C. temperature range, and was even approximately 1.0 in a refluxing system.

To illustrate the effect of monomer and minifer concentrations, $[M]_O$ and $[I]_O$ respectively, experiments were carried out at various concentrations. Results are summarized in Table III. $\bar{F}_n$ values were consistently unity within what is considered to be experimental error. As the table shows, the molecular weights are strongly affected by $[M]_O$ and $[I]_O$. In general, asymmetric polymers can be produced having molecular weights of from about 1000 to about 100,000.

Asymmetric polymer such as Ph-PIB-Cl$^t$ can be used to synthesize linear and graft copolymers. For example, using polyisobutylene as the polymer backbone:

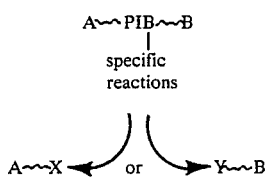

where X and Y are small groups or polymer sequences, such as styryl, methacrylate, phenyl, phenol, isopropenyl and polystyryl. A novel polymer which can be produced by this method is polyisobutenyl methacrylate (PIB-MA). PIB-MA can be homopolymerized or copolymerized using conventional free radical copolymerization techniques. For example, it is possible to produce polyisobutenyl methacrylate/methyl methacrylate graft copolymer (PMMA-g-PIB).

Example 2 illustrates the synthesis of polyisobutenyl methacrylate macromer PIB-MA from the following scheme:

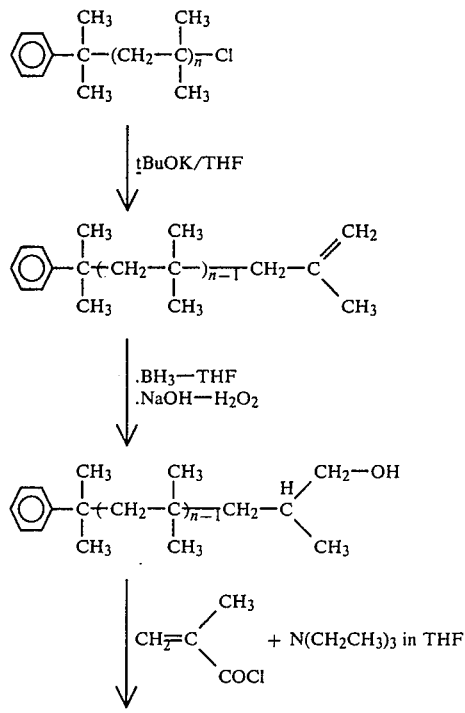

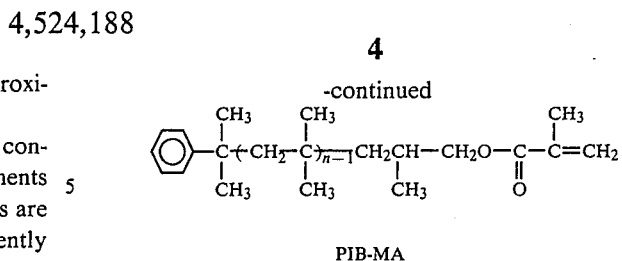

PIB-MA

The synthesis of PIB-MA was accomplished by reacting PIB-alcohol (PIB-CH$_2$OH) with excess methacryloyl chloride in the presence of triethylamine in THF solution. The PIB-CH$_2$OH was prepared from Ph-PIB-Cl$^t$, which in turn was obtained from isobutylene by the use of the cumyl chloride minifer as outlined above.

End group transformations other than to methacrylate can also be accomplished. For example, through Friedel-Crafts alkylation, a phenolic group may be substituted for the tertiary chloro, yielding $\alpha$-phenyl-$\omega$-phenol-polyisobutylene. Selective Friedel-Crafts alkylations may also be made to occur on the phenyl end group. Thus alkyl groups having from 1 to about 10 carbon atoms may be appended to the ring. Further, substitutions such as $SO_3{}^{\ominus}$, $-NH_2$, $-OH$ or $-CH=CH_2$ can be made without affecting the t-chloro or other group attached at the opposite end of the polymer chain.

As mentioned previously, homopolymerization of asymmetric macromolecules (macromers) can be carried out. However, because of the very large pendant groups adjacent to be polymerizable functions, homopolymerizations of reasonably high molecular weight macromers are somewhat difficult. Polymerization of relatively low molecular weight PIB-MA macromer ($\bar{M}_n = 5200$) by the free radical initiator azobisisobutyronitrile (AIBN) has been accomplished and is illustrated in Example 3. In general, the molecular weight of the macromer must be less than about 50,000 for any significant homopolymerization to occur. Molecular weights of the homopolymers are from about 10,000 to about 1,000,000.

A series of copolymerization experiments were carried out using the procedure of Example 3 and the results together with salient reaction conditions are displayed in Table IV. Copolymerizations proceeded readily and the system exhibited nearly ideal behavior i.e., the amount of macromer in the charge and graft copolymers was identical within what is considered to be experimental error.

A series of PMMA-g-PIB's were prepared and select samples characterized. Table V shows data obtained with representative samples. The number of PIB branches per graft backbone can be readily calculated from the overall $\bar{M}_n$ of the graft, $\bar{M}_n$ of the macromer, and weight fractions of PIB and PMMA in the graft. All samples were optically clear; it is of interest that PMMA-g-PIB's containing 20-40 weight percent PIB were transparent by visual observation. The solubility characteristics of a representative PMMA-g-PIB have been examined and the findings collected in Table VI.

The glass transition temperatures of the PMMA-g-PIB copolymers were also examined. All the grafts show two $T_g$'s, one at approximately $-65$ degrees C. for the PIB segment and another at approximately 100 degrees C. for the PMMA component. These values were insensitive to the compositions in the range shown in Table IV. In view of these findings substantial separation must exist between the glassy and rubbery domains of these graft copolymers.

The copolymerization with MMA is merely illustrative of the types of syntheses which may be carried out using the asymmetric polymers. In general, they may be used in any free radical system to produce copolymers with any conventional monomers known to the art, such as the various acrylates, styrene and its derivatives, acrylonitrile, acrylamide and the like. Other suitable monomers may be found in *Block Copolymers,* Allport and James, John Wiley & Sons, New York, N.Y. (1972), which is hereby incorporated by reference. Example 4 illustrates a copolymerization of PIB-MA with styrene.

In general, the graft branches, i.e., the polyisobutylene segments, constitute from about 10 wt % to about 75 wt % of the copolymer. The total molecular weight of the copolymer (branches plus backbone) can vary from about 5,000 to about 500,000 with from about 10,000 to 150,000 preferred. Asymmetric polymers and their copolymers can be used in a wide variety of applications which require physical properties heretofore unattainable in a single structure. For example PMMA-g-PIB combines a rubbery, non polar segment (polyisobutylene) with a polar segment poly (methyl methacrylate) to produce a copolymer having the advantages of both, i.e., high strength and superior chemical resistance.

Other graft copolymers not specifically recited herein can be produced without departing from the scope of the invention. The disclosure should in fact be read as being merely in compliance with the Patent Statutes, which require that the best mode and the preferred embodiments be given. The true scope of the invention can be seen with reference to the attached claims.

EXAMPLE 1

Benzyl chloride was distilled before use. α-Methylbenzyl chloride, cumyl chloride, p-methylcumyl chloride and p-chlorocumyl chloride were prepared from corresponding olefins by hydrochlorination. α,p-Dimethylstyrene was synthesized by the Wittig reaction.

Polymerizations in refluxing methyl chloride were carried out in a 2,000 ml three-neck round bottom flask equipped with stirring bar, thermometer, dropping funnel cooled with i-PrOH under dry $N_2$ atmosphere. Measured amounts of isobutylene and cumyl chloride were added to the flask containing methyl chloride through the dropping funnel. Polymerizations were initiated by carefully introducing $BCl_3$—$CH_2Cl_2$ (0.5 M) solutions to isobutylene-minifer-solvent charges so as to prevent run-away reactions. Polymerizations were extremely rapid and heterogeneous in nature, i.e., the polyisobutylene precipitated as soon as it formed. Reactions were killed by adding methanol at desired intervals and the methyl chloride was evaporated. Purification consisted of dissolving the product in benzene, washing with water to remove boron containing residues, precipitating into methanol, storing overnight, decanting the solvents, redissolving in hexanes, drying over $MgSO_4$, filtering, evaporating the hexanes and drying the final product at room temperature in vacuum. The methanol soluble low molecular weight fraction of the product was lost by this procedure.

Structures and molecular weights were determined by $^1$H-NMR (Varian Associates, T-60 NMR) and GPC (Waters Associates 600 High Pressure GPC, refractive index detectors, μ-Styragel columns of $10^5$, $10^4$, $10^3$, 500 and $10^2$ A). Determinations of number average functionality $\bar{F}_n$ were made by $^1$H-NMR spectroscopy. The method involves dehydrochlorination of Ph-PIB-Cl$^t$ and $^1$H-NMR quantitation of protons associated with the terminal $CH_2=C(CH_3)$— and $C_6H_5$— groups. Inifer efficiency $I_{eff}$ (fraction of inifer consumed during polymerization) was calculated by $I_{eff}=[\text{inifer consumed}]/[\text{inifer charged}]=([M]_O-[M])/(\overline{DP}_n[I]_O)$ where $[M]_O$ and $[M]$ are the initial and final monomer concentrations, and $[I]_O$ is the initial inifer concentrations.

EXAMPLE 2

Materials

Methacryloyl chloride, 1-chloro-3-methyl-2-butene and 2,4,4-trimethyl-1-pentene were distilled under atmospheric pressure and stored in a freezer. Azobisisobutyronitrile (AIBN) was recrystallized from methanol and dried in vacuum. Tetrahydrofuran (THF) and benzene were dried over $CaH_2$ and distilled under $N_2$ just before use. Methyl methacrylate MMA was distilled under vacuum.

Procedures

Synthesis and Characterization of Polyisobutenyl Methacrylate Macromer

Esterification with methacryloyl chloride was carried out in a three-neck round bottom flask equipped with stirrer and dropping funnel under dry $N_2$ at 0 degrees C. A solution of methacryloyl chloride (five-fold excess on PIB) in THF was added to a mixture of polyisobutenyl alcohol (5-10 wt % THF solution) and triethylamine (two-fold excess on methacryloyl chloride). After stirring overnight at room temperature the mixture was filtered. Triethylamine, methacryloyl chloride and THF were evaporated, the residue added to hexanes, and the solution washed twice with methanol and twice with water. After drying over magnesium sulfate the product was isolated by evaporating the hexanes and dried under vacuum at ambient temperature. Structures and molecular weights were analyzed by $^1$H-NMR (Varian Associates T-60 NMR), IR (Perkin-Elmer 521 Spectrometer, 0.5 mm KBr cells and $CCl_4$ solution), GPC (Waters Associates 600 High Pressure GPC, refractive index detector, μ-styragel columns of $10^5$, $10^4$, $10^3$, 500, and $10^2$ A) and VPO (Knauer Vapor Pressure Osmometer Model No. 11.00, toluene solvent at 40 degrees C.).

EXAMPLE 3

Homo- and Copolymerization of Macromer

The PIB-MA macromer was homopolymerized and copolymerized with methyl methacrylate (MMA) in benzene with 2 mole % AIBN initiator at 60 degrees C. The concentrations of PIB-MA and MMA are shown in Table IV. The graft copolymers produced was poly(-methyl methacrylate-g-isobutylene) or PMMA-g-PIB.

The polymerization was conducted in an ampule. The charge was degassed by three freeze-thaw cycles and sealed under vacuum. After polymerization the mixture was poured into methanol. Unreacted PIB-MA macromer was removed by extraction with hexanes and PMMA was removed by extraction with acetonitrile. After solvent extaction the purity of the product was checked by TLC. Conversions of MMA and PIB-MA macromer, and composition of the products were determined by $^1$H-NMR spectrometry. The preparation of larger quantities of graft copolymer was carried out in a three-neck flask equipped with a reflux condenser and mechanical stirrer under $N_2$ atmosphere.

Characterization of Physical Properties

Thermal properties were analyzed by a DuPont 990 Thermal Analyzer with Cell Base Module II.

Stress-strain measurements were conducted on films cast on a Teflon mold from filtered THF solutions (5% w/v). After the solvent had evaporated and its odor disappeared the film was removed from the mold and dried in vacuo at room temperature. Microdumbbells were cut from the films for testing of mechanical properties. Stress-strain measurements were performed by an Instron tester (crosshead speed of 10 cm/min.) at ambient temperature. The averages of at least three, and usually five, test specimens are reported.

EXAMPLE 4

PIB-MA and styrene were copolymerized using the procedure of Example 3. A white, powdery graft copolymer was obtained.

TABLE I

Effect of Minifer Structure on the Polymerization of Isobutylene with $BCl_3$ Coinitiator. ($[M]_o = 1.0$ M, $[I]_o = [BCl_3] = 0.01$ M, methyl chloride solvent, total volume = 250 ml., $-60°$ C., 15 min.)

| Minifer Structure | Conv.[a] (%) | $\overline{F}_n$ | $\overline{M}_n$ (g/mole) | $I_{eff}$[d] |
|---|---|---|---|---|
| $C_6H_5CH_2Cl$ | 44 | | 55,400 | 0.04[b] |
| $C_6H_5CH(CH_3)Cl$ | 42 | | 54,000 | 0.04[b] |
| $C_6H_5C(CH_3)_2Cl$ | 100 | 1.02 | 9,100 | 0.62 |
| p-$CH_3C_6H_4C(CH_3)_2Cl$ | 40 | 1.00 | 2,100[c] | 1.07 |
| p-$ClC_6H_4C(CH_3)_2Cl$ | 81 | 1.02 | 12,300 | 0.36 |

[a]Based on the amounts of isobutylene charged and products
[b]$\overline{F}_n$ was assumed to be unity
[c]Cloudy system, may be close to homogenous
[d]$I_{eff}$ = inifer efficiency, defined as the fraction of inifer consumed during polymerization, calculated as $I_{eff} = [\text{inifer consumed}]/[\text{inifer charged}] = ([M]_o - [M]/(\overline{DP}_n \cdot [I]_o)$ where $[M]_o$ and $[M]$ are the initial and final monomer concentrations, and $[I]_o$ is the initial inifer concentration.

TABLE II

Effect of Temperature on the Polymerization of Isobutylene with the Cumyl Chloride/$BCl_3$ Minifer System ($[M]_o = 1.0$ M, $[I]_o = [BCl_3] = 0.01$ M, Methyl Chloride Solvent, 15 min.)

| Temperature (°C.) | Conv.[b] | $\overline{F}_n$ | $\overline{M}_n$ (g/mole) | $I_{eff}$ |
|---|---|---|---|---|
| $-17.5 \pm 0.5$[a] | 100 | 0.98 | 12,100 | 0.46 |
| $-40$ | 100 | 1.02 | 10,500 | 0.54 |
| $-60$ | 100 | 1.02 | 9,100 | 0.62 |

[a]Refluxing system
[b]Based on the amounts of isobutylene charged and products

TABLE III

Effect of Reaction Conditions on the Polymerization of Isobutylene with Cumyl Chloride/$BCl_3$ Minifer System ($[I]_o = [BCl_3]$, methyl chloride solvent, 20 min., conv. = 100%)

| $[M]_o$ M | $[I]_o$ M | $[I]_o/[M]_o$ | Temperature (°C.) | $\overline{F}_n$ | $\overline{M}_n$ g/mole | $I_{eff}$ |
|---|---|---|---|---|---|---|
| 1.0 | 0.01 | 0.01 | $-17.5 \pm 0.5$ | 0.98 | 12,100 | 0.46 |
| 0.5 | 0.01 | 0.02 | $-17.5 \pm 0.5$ | 0.96 | 9,100 | 0.31 |
| 0.2 | 0.01 | 0.05 | $-19.5 \pm 1.5$ | 0.96 | 5,100 | 0.22 |
| 1.0 | 0.05 | 0.05 | $-16.5 \pm 1.5$ | 0.97 | 5,200 | 0.21 |
| 1.0 | 0.10 | 0.10 | $-16.5 \pm 0.5$ | 0.96 | 2,870 | 0.20 |

TABLE IV

Copolymerization of PIB-MA ($M_1$) with MMA ($M_2$)[a]

| $\overline{M}_n$ of $M_1$ (g/mole) | $M_1$ in Charge (M) | $M_1$ in Charge (mole %) | Conversion (%) $M_1$ | Conversion (%) $M_2$ | Graft Copolymer Composition (mole %)[b] $M_1$ | Graft Copolymer Composition (mole %)[b] $M_2$ |
|---|---|---|---|---|---|---|
| 3,200 | 0.021 | 5.9 | 12 | 20 | 3.7 | 96.3 |
| 3,200 | 0.025 | 9.6 | 8 | 10 | 7.7 | 92.3 |
| 3,200 | 0.029 | 11.6 | 15 | 29 | 8.0 | 92.0 |
| 3,200 | 0.031 | 16.0 | 18 | 17 | 12.5 | 87.5 |
| 4,800 | 0.030 | 22.0 | 13 | 15 | 19.0 | 81.0 |

[a]Benzene solvent, 60° C., [AIBN] = 2 mole %, 10 hrs.
[b]By $^1$H—NMR

TABLE V

Structure and Physical-Mechanical Characterization of PMMA-g-PIB

| | | Graft Copolymer | | | Stress-Strain Test[d] | |
|---|---|---|---|---|---|---|
| $\overline{M}_n$ of PIB-MA | PIB-MA in the feed (mole %)[a] | $\overline{M}_n$[b] | PIB (wt %)[c] | Number of PIB branches per chain | Tensile Strength (Pa) | Initial Modulus (Pa) |
| 0 | 0 | 105,000 | 0 | 0 | $3.11 \times 10^7$ | $3.19 \times 10^9$ |
| 4,800 | 0.020 | 102,000 | 23 | 3.1 | $1.45 \times 10^7$ | $1.16 \times 10^9$ |
| 4,600 | 0.038 | 92,000 | 44 | 8.9 | $1.12 \times 10^7$ | $6.37 \times 10^8$ |
| 8,500 | 0.036 | 69,000 | 37 | 3.0 | $1.26 \times 10^7$ | $6.28 \times 10^8$ |

[a]Polymerization in benzene solution at reflux temperature. AIBN was added at intervals of 12 hours to complete the reaction (usually 3 days).
[b]By membrane osmometry
[c]By $^1$H—NMR
[d]Samples broke at less than 2% elongation; averages of at least three samples are shown.

TABLE VI

Solubility of a PMMA-g-PIB[a] (O) Soluble, (X) Insoluble

| SOLVENT | PIB | PMMA | PMMA-g-PIB |
|---|---|---|---|
| Pentane | O | X | X |
| Tetrachloromethane | O | X | O |
| Methylene chloride | X | O | O |
| Acetone | X | O | X |
| Acetonitrile | X | O | X |
| Chloroform | O | O | O |
| Benzene | O | O | O |
| THF | O | O | O |

[a]PMMA-g-PIB ($\overline{M}_n$ = 92,000, PIB = 44 wt. %, $\overline{M}_n$ of PIB in the graft = 4,600, number of PIB branches per backbone = 9.0). Solubilities were determined by adding 1 g graft to 50 mL solvent and storing the system at room temperature for one day.

What is claimed is:

1. An asymmetrically telechelic polymer, comprising:

A—PIB—B wherein PIB is a polyisobutylene backbone, and A and B are different, wherein A is selected from the group consisting of phenyl and substituted phenyl, wherein said substitution may be at any position and is selected from the group consisting of vinyl, $-SO_3^{\ominus}$, $-OH$, $-NO_2$, $-NH_2$, and alkyl groups having from 1 to 10 carbon atoms; and wherein B is selected from the group consisting of methacrylate, hydroxyl, and vinylidene.

2. An asymmetrically telechelic polymer according to claim 1, wherein the polymer has a molecular weight of from about 1,000 to about 100,000.

3. An asymmetrically telechelic polymer according to claim 2, wherein A is a phenyl group and B is selected from the group consisting of hydroxyl and methacrylate.

4. An asymmetric polymer according to claim 3, wherein said polymer is polyisobutenyl methacrylate having a molecular weight of from about 1,500 to about 15,000.

5. An asymmetric polymer according to claim 3, wherein said polymer is polyisobutenyl alcohol.

6. An asymmetric polymer according to claim 2, wherein said polymer is α-phenyl-ω-phenol polyisobutylene.

7. A homopolymer, comprising:
the product of homopolymerization of an asymmetric polymer having the formula:

A—PIB—B

A—PIB—B wherein PIB is a polyisobutylene backbone, and A and B are different, wherein A is selected from the group consisting of phenyl and substituted phenyl, wherein said substitution may be at any position and is selected from the group consisting of vinyl, $-SO_3^{\ominus}$, $-OH$, $-NO_2$, $-NH_2$, and alkyl groups having from 1 to 10 carbon atoms; and wherein B is selected from the group consisting of methacrylate, hydroxyl, and vinylidene.

8. A homopolymer according to claim 7, wherein said asymmetric polymer has a molecular weight of from about 1,000 to about 100,000.

9. A homopolymer according to claim 8, wherein the homopolymer has a molecular weight of from about 10,000 to about 1,000,000.

10. A homopolymer according to claim 9, wherein said asymmetric polymer is polyisobutenyl methacrylate having a molecular weight of from about 3,200 to about 5,200.

* * * * *